[11] 3,547,197

| [72] | Inventors | Arthur A. Chevalier;<br>David M. Mathews, Cody, Wyo.; William E. Rourke, Anchorage, Alaska |
|---|---|---|
| [21] | Appl. No. | 823,491 |
| [22] | Filed | May 9, 1969 |
| [45] | Patented | Dec. 15, 1970 |
| [73] | Assignee | Marathon Oil Company<br>Findlay, Ohio<br>a corporation of Ohio |

[54] METHOD OF ACIDIZATION
14 Claims, No Drawings

[52] U.S. Cl.................................... 166/284, 166/307
[51] Int. Cl..................................... E21b 33/13, E21b 43/27
[50] Field of Search........................... 166/284, 307, 305

[56] References Cited
UNITED STATES PATENTS

| 2,754,910 | 7/1956 | Derrick et al............... | 166/284 |
| 3,010,514 | 11/1961 | Fox .............................. | 166/284 |
| 3,086,587 | 4/1963 | Zandmer et al............. | 166/284 |
| 3,174,546 | 3/1965 | Flickinger................... | 166/284X |
| 3,292,700 | 12/1966 | Berry............................ | 166/284 |
| 3,437,147 | 4/1969 | Davies......................... | 166/284 |
| 3,441,085 | 4/1969 | Gidley......................... | 166/307 |
| 3,482,633 | 12/1969 | Stipp et al.................... | 166/284 |

*Primary Examiner*—Stephen J. Novosad
*Attorneys*—Joseph C. Herring and Richard C. Willson ABSTRACT: A method of acidizing a subterranean formation penetrated by a well bore having a casing with perforations therein in fluid communication with the formation, the method comprising successively injecting into the formation at least two series of slugs, the first series consisting of a slug of acid followed by about an equal volume of water and the water followed by sufficient number of sealer balls (having sufficient diameter to seal the perforations) to seal the more permeable perforations within the casing; the second series repetitive of the first, except there are sufficient number of sealer balls to seal the lesser permeable perforations; and then injecting a slug of acid followed by sufficient water to displace the acid out into the formation. The total volume of acid can be at least 30 gallons per vertical foot of formation to be treated. Also, the number of perforations can be up to about four perforations per vertical foot of formation to be treated.

METHOD OF ACIDIZATION

PRIOR ART OF THE INVENTION

Acids are commonly used to stimulate subterranean formations to produce crude oil. Hydrochloric acid is preferred since it leaves no insoluble reaction product. Hydrochloric acid within the lime formation reacts according to the formula:

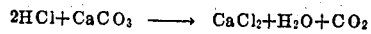
$$2HCl + CaCO_3 \longrightarrow CaCl_2 + H_2O + CO_2$$

However, it is thought that the formation of calcium chloride on the veneer of the particle of the rock tends to inhibit further ingress of the hydrochloric acid to react with other portions of the rock or lime formation which is not in direct contact with the acid, especially with highly concentrated acid.

The prior art has used sealer balls (made of rubber, plastic, metal, etc.) in combination with acidizing treatments conducted in perforated casings. The purpose of the sealer balls is to seal off or block the more permeable perforations (i.e. perforations in the casing adjacent the permeable formation or rock) from receiving the acid. This permits the remainder of the acid to be diverted to the less permeable perforations and thus obtain a more uniform acidizing treatment of the formation adjacent the perforations within the casing.

SUMMARY OF THE INVENTION

Applicants have discovered a novel process of effecting an improved acidizing process wherein the acid is uniformly displaced out into the formation to obtain maximum effect of the acid on the formation. This is accomplished by displacing the acid into the formation and by selectively plugging the more permeable zones throughout the acidizing process. The acid is displaced into the formation by water (preferably at least an equal volume of water) following the volume of acid and the selective plugging of the more permeable zones within the formation is obtained by the use of sealer balls following the injection of the water. By repeating a series of slugs in the following order: acid slug, water slug and sealer balls, this improved acidizing process is accomplished. This process is especially useful in the Oregon Basin wherein different permeabilities within a formation are experienced.

DESCRIPTION OF THE PREFERRED EMBODIMENTS

Acids useful with this invention include hydrochloric acid, sulfuric acid, sulfamic acid, citric acid, acetic acid, and like materials. Preferably, the acid is one which does not form undesirable or incompatible products within the subterranean formation. Preferably the acid is hydrochloric acid and preferably is at a concentration range of from about 15 percent to up to about 28 percent.

The acid can contain inhibitors (e.g. inorganic and organic inhibitors) to avoid damage to casing, tubing, pumps, valves, and related equipment. In addition, the acid solution can contain a surfactant, e.g. to improve the wetting efficiency or lower the surface tension of the acid solutions with the formation fluids. The use of surfactants generally improves the efficiency of the acidizing solution in many ways. Also, deemulsifiers can be incorporated within the acid solution. Other agents such as silica controlled additives, particular agents known in the art, etc. can be incorporated into the acid solution to impart desired characteristics.

Sufficient acid is injected into the formation to effectively increase the permeability of the formation to produce formation fluids. Normally at least about 30 gallons of 15—28 percent strength hydrochloric acid is useful to effectively stimulate the formation. Preferably, at least about 40 gallons of 28 percent hydrochloric acid per vertical foot of perforated formation is useful with a tight formation (e.g. about 30—40 md.).

Following the slugs of acid into the formation, there is injected sufficient volume of water to displace the acid out into the formation. Preferably at least about an equal volume of water, based on the preceding volume of acid, is injected.

After the volume of water is injected into the formation, sealer balls are injected to seal off the more permeable perforations of the casing and thus divert the next slug of acid to lesser permeable perforations. The sealer balls can be made of nylon, rubber, neoprene, metal, plastic, or other like materials or combinations of these materials. The sealer ball should have a diameter at least that and preferably greater than the average diameter of perforations within the casing. Also, it is preferred that the diameter and material of the sealer ball be such that it will become readily dislodged upon returning the well to production. A preferred sealer ball is one that is rubber coated. The total number of sealer balls injected depends on the degree of differing permeabilities, the number of perforations, etc. Generally, the number of sealer balls can be at least about 75 percent of the number of perforations.

As mentioned previously, the well bore in communication with the subterranean formation has a casing extending down to the producing formation. The casing is perforated, preferably up to about four or more holes per vertical foot of casing. The perforations are effected by methods known in the art, e.g. bullets, shaped charges, etc. Where the perforations have an overage average diameter of about ½ inch, sealer balls of about ¾ inch or ⅞ inch in diameter are useful.

This invention overcomes the problem of allowing acid to spend itself near the well bore rather than obtaining maximum penetration and efficiency by continuing to move the acid and displacing it out into the formation. By this invention, the acid can come in contact with more surface area within the lime formation. Also, uniform displacement of the acid in formation zones of varying permeabilities is accomplished by successive injections of acid followed by water and the water followed by a sufficient number of sealer balls to seal the more permeable perforations; this series of injections repeated until lesser permeable perforations are injected with acid. The overall result is to effect substantially a uniform stimulation of the formation. The number of series of injections can be indefinite, but the average number is about three for a perforation zone of about 30 feet wherein average permeabilities of from about 25 md. to about 100 md. are characteristic. The total number of series of injections can depend upon, inter alia, the size of treatment, formation to be treated, number of perforations, volume of acid injected per series and the number of sealer balls. After the last batch of sealer balls is injected, another slug of acid can be injected and this followed by at least an equal volume of water to displace the acid out into the formation. Sealer balls are not necessary after the last volume of water.

During the process, it is important that operating conditions be such that the sealer balls do not become dislodged. That is, the effect of sealing the more permeable formations before all or substantially all of the acid is injected should not be lost due to an adverse drop in flow rate, pressure, etc.

Example of flow rates to maintain efficient operation include from about less than 5 to about 15 b.p.m. (barrels per minute) and preferably from about 7 to about 10 b.p.m. The 7—10- b.p.m. range gives efficient operation of the sealer balls in the process.

The following examples are presented to teach specific working embodiments of the invention. Such are not intended to limit the invention in any way; rather, all equivalents obvious to those skilled in the art are meant to be included within the invention as defined within the specification and appended claims. Unless otherwise specified, all percents are based on volume.

EXAMPLE I

A well has perforations (average diameter about ½ inch) of two holes per foot over a depth of 30 feet. It is treated by injecting 28 percent hydrochloric acid and water at a rate of 9 b.p.m. (barrels per minute) at an average pressure of 1500 p.s.i.g. First, there is injected 500 gallons of the acid followed by 500 gallons of water and then 25 sealer balls (nylon reinforced with rubber coating, diameter = ¾ inch) in about 50 gallons of water. A pressure increase of 200—300 p.s.i.g. is realized, thus indicating the more permeable perforations are sealed. The increase in pressure subsides. Thereafter, 500 gallons of the acid is injected followed by 500 gallons of water and this followed by 25 sealer balls in about 50 gallons of water. A pressure increase of 200—300 p.s.i.g. is realized—the pressure increase subsides. Again, 500 gallons of acid is injected followed by 500 gallons of water and 20 sealer balls in about 50 gallons of water. Again a pressure increase of 200—300 p.s.i.g. is realized, and the pressure subsides gradually. Finally, there is injected 500 gallons of acid followed by 500 gallons of water, no sealer balls are injected. The total water injected overdisplaces the acid by 100 percent. Instant shut-in pressure indicated a vacuum. The acid is permitted to remain in the formation for 1 hour and then the well is swabbed. On swabbing, 90 barrels of acid/water mixture is recovered in 3 hours. Fluid level after swabbing is at a depth of 2600 feet and a good show of oil is indicated. 13 days later the well is producing 139 b.o.p.d. (barrels of oil per day) and 3315 b.w.p.d. (barrels of water per day).

EXAMPLE II

A well was perforated (average diameter = ½ inch) with two holes per foot for a distance of 30 feet. The well is treated at the rate of about 10 b.p.m. and an average pressure of 1100 p.s.i.g. with the following series of injections: 1. 350 gallons of the acid (28 percent followed by 500 gallons of water followed by 15 sealer balls in about 50 gallons of water, 2. series 1 is repeated, 3. series 1 is repeated again, and 4. 450 gallons of the acid (28 percent HCD is injected followed by 1360 gallons of water. Good pressure increases were realized after the injections of sealer balls. Sealer ball diameter = ¾ inch. The initial shut-in pressure indicated a vacuum. The acid was permitted to remain in the rock for 1 hour and then the well was swabbed, about 200 barrels of fluid were swabbed in 5 hours. A good show of oil was indicated. Thereafter, the production string was run in the well and the well was placed on production. A week later, the well was still producing a large quantity of oil.

We claim:

1. A process of acidizing a subterranean formation having different permeabilities and penetrated by a well bore having a casing with perforations therein in fluid communication with the formation, the method comprising:
   1. injecting a first series of slugs consisting of a slug of acid followed by a sufficient amount of water to displace the acid out into the formation, then injecting a sufficient number of sealer balls of sufficient diameter to substantially seal the more permeable perforations;
   2. injecting at least a second series of slugs consisting of a slug of acid followed by a sufficient amount of water to displace the slug of acid out into the formation, then injecting sufficient number of sealer balls of sufficient diameter to substantially seal the lesser permeable perforations; and then,
   3. injecting a slug of acid followed by sufficient amounts of water to displace the acid out into the formation.

2. The process of claim 1 wherein the total volume of acid injected is equal to at least about 30 gallons per vertical foot of formation to be treated.

3. The process of claim 1 wherein the amount of water injected which follows the acid slug, is equal to at least about the volume of acid.

4. The process of claim 1 wherein the injection rate of the process is from about 5 to about 15 barrels per minute.

5. The process of claim 1 wherein the slugs of acid are about equal in volume.

6. The process of claim 1 wherein the sealer balls are rubber coated.

7. The process of claim 1 wherein the acid is hydrochloric acid.

8. The process of claim 1 wherein a third series of slugs, identical to the second series, is injected before step three.

9. The process of claim 1 wherein the majority of the permeabilities average from about 25 to about 100 md.

10. The process of claim 1 wherein the total number of sealer balls is at least 75 percent of the total number of perforations.

11. The process of claim 1 wherein the injection rate of the process is from about 7 to about 10 barrels per minute.

12. The process of claim 1 wherein at least one slug of the acid contains a surfactant.

13. The process of claim 1 wherein at least one slug of the acid contains an inhibitor.

14. The process of claim 1 wherein at least one slug of the acid contains a deemulsifier.

UNITED STATES PATENT OFFICE
CERTIFICATE OF CORRECTION

Patent No. 3,547,197      Dated December 15, 1971

Inventor(s)    A. A. Chevalier, D. M. Mathews, and W. E. Rourk

It is certified that error appears in the above-identified patent and that said Letters Patent are hereby corrected as shown below:

Column 3, line 33:      Delete "HCD" and insert --HCl--.

SIGNED AND SEALED
MAR 9 1971

(SEAL)
Attest:

Edward M. Fletcher, Jr.
Attesting Officer

WILLIAM E. SCHUYLER, JR.
Commissioner of Patents